US006803435B2

(12) United States Patent
Coggio et al.

(10) Patent No.: US 6,803,435 B2
(45) Date of Patent: Oct. 12, 2004

(54) CURABLE FLUOROPOLYMERS CONTAINING BROMINE GROUPS HAVING IMPROVED COMPRESSION SET

(75) Inventors: William D. Coggio, Hudson, WI (US); Peter J. Scott, Madison, AL (US); Klaus Hintzer, Kastl (DE); Erik D. Hare, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/198,426

(22) Filed: Jul. 18, 2002

(65) Prior Publication Data

US 2004/0014900 A1 Jan. 22, 2004

(51) Int. Cl.$^7$ .................................................. C08F 4/30
(52) U.S. Cl. ........................ 526/229; 526/249; 526/255
(58) Field of Search ................................ 526/255, 249, 526/229

(56) References Cited

U.S. PATENT DOCUMENTS

| | | | |
|---|---|---|---|
| 3,937,690 A | | 2/1976 | Weisgerber et al. |
| 4,000,356 A | | 12/1976 | Weisgerber et al. |
| 4,035,565 A | | 7/1977 | Apotheker et al. |
| 4,148,982 A | | 4/1979 | Morozumi et al. |
| 4,214,060 A | | 7/1980 | Apotheker et al. |
| 4,243,770 A | | 1/1981 | Tatemoto et al. |
| 4,277,586 A | | 7/1981 | Ukihashi et al. |
| 4,501,869 A | * | 2/1985 | Tatemoto et al. ............ 526/249 |
| 4,694,045 A | | 9/1987 | Moore |
| 4,745,165 A | | 5/1988 | Arcella et al. |
| 4,748,223 A | | 5/1988 | Haruyoshi et al. |
| 4,774,302 A | * | 9/1988 | Tatsu et al. ................. 526/206 |
| 4,920,170 A | | 4/1990 | Abe et al. |
| 5,037,921 A | | 8/1991 | Carlson |
| 5,077,359 A | | 12/1991 | Moore |
| 5,173,553 A | | 12/1992 | Albano et al. |
| 5,219,964 A | | 6/1993 | Albano et al. |
| 5,264,509 A | | 11/1993 | Arcella et al. |
| 5,285,002 A | | 2/1994 | Grootaert |
| 5,354,824 A | | 10/1994 | Arcella et al. |
| 5,378,782 A | | 1/1995 | Grootaert |
| 5,585,449 A | | 12/1996 | Arcella et al. |
| 5,910,552 A | | 6/1999 | Saito et al. |
| 6,160,053 A | | 12/2000 | Enokida et al. |
| 6,310,142 B1 | | 10/2001 | Apostolo et al. |
| 6,346,300 B1 | * | 2/2002 | Ruepping ................... 427/517 |

FOREIGN PATENT DOCUMENTS

| | | |
|---|---|---|
| EP | 0 101 930 B1 | 3/1984 |
| EP | 0 398 298 A1 | 11/1990 |
| EP | 0 407 937 A1 | 1/1991 |
| EP | 0 446 725 A1 | 9/1991 |
| EP | 0 570 762 A1 | 11/1993 |
| EP | 0 661 304 A1 | 7/1995 |
| EP | 0 708 797 B1 | 5/1996 |
| EP | 0 769 521 A1 | 4/1997 |
| EP | 0 784 064 A1 | 7/1997 |
| WO | WO 99/48939 | 9/1999 |

OTHER PUBLICATIONS

Orr, R.J.; Williams, H.L.; *Journal of American Chemistry Society*, vol. 77, "The Efficiency of Initiation by Cumyloxy and Sulfoxy Radicals In Free Radical Polymerization", p. 5195, 1955.

Pramanick, D.J.; *Indian Chemical Society*, vol. 55, "Ferrous–Chlorate Redox System As Initiator Of Aqueous Vinyl Polymerization", p. 572, 1978.

Pramanick, D.; Saha,M.; *Journal of Polymer Science*, Part A–1, vol. 4, "Studies in Some New Initiator Systems for Vinyl Polymerization. Part I. Molecular Halogens or Halates as One Component", p. 2137, 1966.

Sarac, A.S.; *Prog. Polymer Science*, vol. 24, "Redox Polymerization", p. 1149, 1999.

* cited by examiner

*Primary Examiner*—Bernard Lipman
(74) *Attorney, Agent, or Firm*—Dean M. Harts

(57) ABSTRACT

The present invention provides a curable composition comprising a fluoropolymer comprising interpolymerized units derived from (i) $CF_2=CF-R_f$, wherein $R_f$ is fluorine or a $C_1-C_8$ perfluoroalkyl, (ii) at toast about 10 mole percent of a hydrogen-containing $C_2-C_9$ olefin, based on the total moles of said $CF_2=CFR_f$ and said olefin, (iii) an average of two or more bromine atoms including one or more terminal bromine atom(s) per fluoropolymer chain, (iv) optionally $CX_2=CX-R$, wherein each X is independently H, F, or Cl and R is a halogen or a $C_1-C_8$ alkyl or alkenyl group that may include one or more ether linkage(s), (v) optionally a bromine-containing cure site monomer; (b) optionally, a peroxide curing agent; and (c) optionally, a crosslinking co-agent. The invention also provides methods of making and using such fluoropolymer compositions.

26 Claims, No Drawings

CURABLE FLUOROPOLYMERS CONTAINING BROMINE GROUPS HAVING IMPROVED COMPRESSION SET

TECHNICAL FIELD

This invention relates to peroxide-curable fluoropolymer compositions having interpolymerized units of a $C_2$–$C_{10}$ fluorinated olefin, which may contain one or more heteroatom(s), and a hydrogen-containing $C_2$–$C_9$ olefin, which may be made in the presence of a brominated salt. The invention also relates to methods of making such fluoropolymer compositions and articles made from the cured compositions.

BACKGROUND

Fluoroelastomers having up to one iodine or bromine atom at the end of a polymeric chain, with a bromine content in the chain from 0.05–2 weight percent (wt %) are described in U.S. Pat. No. 5,173,553. These fluoroelastomers are said to have improved proccessability, particularly in injection molding processes, mold release, and heat stability. The fluoroelastomers are made from fluorinated monomeric units of vinylidene fluoride and/or tetrafluoroethylene, and optionally hexafluoropropene and/or perfluoroalkyl-perfluorovinylethers. These fluorinated copolymers can be combined with amounts up to 40 mole percent (mol %) of monomeric units derived from ethylene, propylene, butene, and/or isobutylene.

Copolymers of tetrafluoroethylene and propylene have been prepared and cured with peroxides. The physical properties of such polymers after curing have undesirably high compression set values.

SUMMARY

Briefly, the present invention provides a curable composition comprising (a) a fluoropolymer comprising interpolymerized units derived from (i) $CF_2$=$CF$—$R_f$, wherein $R_f$ is fluorine or a $C_1$–$C_8$ perfluoroalkyl, (ii) at least about 10 mole percent of a hydrogen-containing $C_2$–$C_9$ olefin, based on the total moles of said $CF_2$=$CFR_f$ and said olefin, (iii) an average of two or more bromine atoms including one or more terminal bromine atom(s) per fluoropolymer chain, (iv) optionally $CX_2$=$CX$—R, wherein each X is independently H, F, or Cl and R is a halogen or a $C_1$–$C_8$ alkyl or alkenyl group that may include one or more ether linkage(s), (v) optionally a bromine-containing cure site monomer; (b) optionally, a peroxide curing agent; and (c) optionally, a crosslinking co-agent. The fluoropolymer in the curable composition preferably is polymerized in the presence of a bromine salt.

In another aspect, the invention provides a cured fluoroelastomer composition comprising the reaction product of (a) a copolymer comprising tetrafluoroethylene and propylene having an average of two or more bromine atoms including one or more terminal bromine atom(s) per polymer chain, (b) a peroxide curing agent, and (c) optionally, a crosslinking co-agent; wherein the composition has a compression set value lower than a comparative copolymer having a similar comonomer ratio and having an average of less than two bromine atoms per chain. This comparative copolymer is similar to the inventive fluoropolymer in that the ratio of monomers are within about 5 mol % or even closer, but the comparative material has lower amounts of bromine such that it contains less than two bromine atoms per polymer chain and/or has fewer than the one or more terminal bromine atoms of the inventive fluoropolymer.

In still another aspect, the present invention provides a method of preparing a fluoropolymer composition comprising (a) combining $CH_2$=$CF$—$R_f$, wherein $R_f$ is fluorine or a $C_1$–$C_8$ perfluoroalkyl, with at least about 10 mole percent of a hydrogen-containing $C_2$–$C_9$ olefin, based on the total moles of said $CH_2$=$CFR_f$ and said olefin, a brominated salt, optionally $CX_2$=$CX$—R, wherein each X is independently H, F, or Cl and R is a halogen or a $C_1$–$C_8$ alkyl or alkenyl group that may include one or more ether linkage(s), and optionally a bromine-containing cure site monomer, together with an initiator, and polymerizing the combination.

In still another aspect, the present invention provides fluoropolymer articles containing cured compositions.

The invention provides fluorinated elastomers (e.g., tetrafluoroethylene-propylene or "TFE-P") that are made in the presence of radical initiators and a bromine salt. Surprisingly, the initiator system of the present invention provides curable fluoropolymer, such as TFE-P, with excellent physical properties even where cure site monomers are absent from the fluoropolymer. These fluoroelastomers exhibit improvements in physical properties. Another advantage of the present invention is that the fluoroelastomers of the invention, after curing, exhibit significantly reduced compression set as compared to known TFE-P elastomers.

Other features and advantages of the invention will be apparent from the following detailed description of the invention and the claims. The above summary of principles of the disclosure is not intended to describe each illustrated embodiment or every implementation of the present disclosure. The following detailed description more particularly exemplifies certain preferred embodiments utilizing the principles disclosed herein.

DETAILED DESCRIPTION

The fluoroelastomer compositions of the invention are derived from interpolymerized units of fluorinated monomers, having the formula $CH_2$=$CF$—$R_f$, wherein $R_f$ is fluorine or a $C_1$–$C_8$ perfluoroalkyl, along with hydrogen-containing $C_2$–$C_9$ olefins, which have less than half of the hydrogen atoms substituted with fluorine, more preferably less than one-fourth of the hydrogen atoms substituted with fluorine, and which are non-fluorinated in other embodiments.

The polymer may optionally contain one or more bromine-containing cure site monomer such as bromotrifluoroethylene (BTFE), bromodifluoroethylene (BDFE), bromotetrafluorobutene (BTFB), perfluoro vinyl ethers having one or two fluorine atoms substituted with bromine atoms, an iodine-containing cure site monomer, and the like. The amount of bromine-containing cure site monomer in the fluoropolymer is up to about 5 mole percent (mol %) or less. The amount of bromine-containing cure site monomer, when included, preferably is from about 0.01 to about 4 mol %, and more preferably from about 0.05 to about 2 mol %, based on the total fluoropolymer composition. In cases where the fluoropolymer contains a bromine-containing cure site monomer, the amount of the hydrogen-containing $C_2$–$C_9$ olefin is at least 10 mol % of the total fluoropolymer composition. Propylene is one preferred $C_2$–$C_9$ olefin.

The curable compositions have an average of two or more bromine atoms per fluoropolymer chain. These bromine atoms typically are found at the polymer chain ends, i.e., terminal bromine atoms. Bromine atoms also may be found substituted along the polymer backbone, such as when a linear polymer is polymerized using, e.g., a brominated perfluorovinyl ether or a bromotetrafluorobutene (BTFB) cure site monomer. These fluoropolymers have at least one terminal bromine atom.

In another embodiment of the invention, a bromine-containing cure site monomer is not necessary to enable crosslinking of the inventive fluoroelastomer compositions. In this aspect, the curable compositions have an average of two or more terminal bromine atoms per fluoropolymer chain. Such terminal bromine atoms occur on the main chain and/or chain branches.

The fluoropolymer chains in the inventive composition may be linear, branched, or a combination thereof. The curable compositions yield fluoroelastomer with excellent, physical properties, including low compression set, whether or not a bromine-containing cure site monomer is included. In contrast, comparable materials similar in every respect except having less than one bromine atom per chain do not cure to provide desirable properties. Also in contrast, comparable materials having levels of bromine-containing cure site monomers similar to the inventive fluoropolymer but lacking the additional bromine atoms at the polymer chain ends (provided in the inventive fluoropolymer) have much higher compression set levels.

When the fluoropolymer does not contain a cure site monomer, the amounts of the hydrogen-containing $C_2$–$C_9$ olefins ranges from at least about 10 mol %, more preferably at least about 15 or even 20 mol %. In other embodiments, the hydrogen-containing $C_2$–$C_9$ olefin content ranges from at least about 25 mol %, more preferably at least about 30 or even at least about 40 mol %. The amounts of these hydrogen-containing olefins ranges from below about 90 mol %, more preferably below about 80 mol %. In some preferred embodiments, these fluoropolymers contain vinylidene fluoride in amounts from about 0.5 to about 20 mol %.

Olefins useful in the invention include those of the formula:

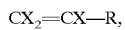

wherein each X is, independently, hydrogen or fluorine or chlorine, R is hydrogen, fluorine, or a $C_1$–$C_{12}$, preferably $C_1$–$C_3$, alkyl. Preferred olefins include partially-fluorinated monomers (e.g., vinylidene fluoride) or hydrogen-containing monomers such as olefins including α-olefins (e.g., ethylene, propylene, butene, pentene, hexene, and the like). Combinations of the above-mentioned materials are also useful.

Perfluorinated vinyl ethers also are suitable as comonomers in the present invention. Such perfluorovinylethers include, for example, $CF_2=CFOCF_3$, $CF_2=CFOCF_2CF_2OCF_3$, $CF_2=CFOCF_2CF_2CF_2OCF_3$, $CF_2=CFOCF_2CF_2CF_3$, $CF_2=CFOCF_2CF(CF_3)OCF_2CF_2CF_3$, and $CF_2=CFOCF_2CF(CF_3)OCF_2CF(CF_3)OCF_2CF_2CF_3$.

The fluoroelastomer compositions of the present invention are prepared by any known method. One inventive method is a free radical polymerization process, carried out in an aqueous emulsion, in the presence of a bromine-containing salt. Bromine-containing salts include compounds capable or providing bromine ions in the polymerization medium and conditions. These include, for example, KBr, NH₄Br, other salts of HBr, bromides of the metals belonging to groups I and II, A and B of the Periodic System, such as for example Li, Na, K, Rb, Cs, Be, Mg, Ca, Sr, Ba, Cu, Ag, Zn, Cd, as well as the transition metals, such as for example Fe, Co, Ni, Ru, Rh, Pd, Pt, or belonging to groups III and IV B of the Periodic System, such as for example Al, Ga, Sn, Pb. The bromides or the alkaline or alkaline-earth metals are preferably used. The amount of such compounds capable of providing bromide ions, to be used in the process of the invention, is that amount effective to produce the desired results, such as the desired level of compression set resistance. The molar ratio of bromide salt compared to the initiator is preferably between about 1:0.1 and 1:10, more preferably between about 1:0.5 and 1:5. In addition to the above-mentioned bromine-containing salts, alkyl ammonium salts, such as $NR_4^+Br$, and $HN(R)_3^+Br$, wherein R is a $C_1$–$C_9$ alkyl can be used. Still another useful class of bromine-containing compounds is the imides, such as N-Bromosuccinimide. Preferred bromine salts include KBr, $FeBr_2$, CuBr, and quaternary salts such as $NH_4Br$.

The curable fluoropolymer of the invention comprises an average of two or more bromine atoms (of which one or more bromine atom(s) are terminal) per fluoropolymer chain. When less than one bromine atom per fluoropolymer chain is used, the quantity of these atoms is too low to crosslink the fluoroelastomers into a network having desirable physical properties such as low compression set.

Optionally during a free radical polymerization process, bromine-containing chain transfer agents (CTA) can be used, such as a brominated compound that contains one or two bromine atoms and is sufficiently stable that undesirable side reactions do not proceed under the desired polymerization conditions.

In some embodiments of the present invention, no chain transfer agents (CTA) are used, as such materials result in undesirable organic residues and reduce the rate of polymerization. In such an embodiment, the resulting fluoropolymer is substantially free of residue from a chain transfer agent. That is, the fluoropolymer contains less than about 0.1 wt %, preferably less than 0.05 wt %, more preferably 0 wt % residue from a CTA. Such chain transfer agents are known in the art, e.g., U.S. Pat. No. 4,000,356 to Weisgerber, et al., which is herein incorporated by reference.

The preferred APS/KBr system of the present invention provides one or more advantages including improving the polymerization rate, leaving no undesirable organic residue, increasing the efficiency of the polymerization, and providing fluoropolymers having low compression set features. Such polymers may contain residue from an inorganic bromine salt, or this residue can be removed via known methods.

The inventive compositions can be elastomers or thermoplastics.

One example of a useful fluoropolymer consists essentially of principal monomer units of tetrafluoroethylene and at least one olefin. In this embodiment, the copolymerized olefin units comprise from at least about 10 to about 70 mol % (more preferably 35 to 60 mol %) of total monomer units present in the copolymer.

Surprisingly, the polymers made with the bromine-containing materials have much better properties, such as lower compression set, than comparative polymers made via processes lacking these materials.

The fluoroelastomer compositions of the present invention surprisingly can be cured using one or more known curing agents, preferably peroxide compounds, optionally along with one or more crosslinking coagents, even in the absence of a cure site monomer. Suitable peroxide curatives generally are those which generate free radicals at curing temperatures, such as those described in the art, e.g., WO 99/48939, the disclosure of which is herein incorporated by reference. Dialkyl peroxide and bis(dialkyl peroxide), each of which decomposes at a temperature above 50° C., are particularly preferred, wherein the alkyl group has from 1 to 12 carbon atoms (more preferably 1 to 6 carbon atoms) and may be linear or branched. In many cases it is preferred to use a di-tertiarybutyl peroxide having a tertiary carbon atom attached to peroxy oxygen atom. Among the preferred peroxides of this type are 2,5-dimethyl-2,5-di(tertiarybutylperoxy)hex-3-yne and 2,5-dimethyl-2,5-di(tertiarybutylperoxy)-hexane. Additional examples of useful peroxides include compounds such as dicumyl peroxide, dibenzoyl peroxide, tertiarybutyl perbenzoate, a,a'-bis(i-butylperoxy-diisopropylbenzene), and di[1,3-dimethyl-3-(t-butylperoxy)-butyl]carbonate. Generally, about 1 to 3 parts of peroxide per 100 parts of perfluoroelastomer is used.

The fluoroelastomer compositions can include any of the adjuvants commonly employed in curable fluoroelastomer formulations. Optionally, one or more crosslinking co-agents may be combined with the peroxide curative. For example, one material often blended with a fluoroelastomer composition as a part of a curative system is a coagent (sometimes also referred to as a co-curative) composed of a polyunsaturated compound that is capable of cooperating with the peroxide curative to provide a useful cure. These coagents are particularly useful in combination with a peroxide curative. The coagent(s) can generally be added in an amount equal to between 0.1 and 10 parts coagent per hundred parts fluoropolymer (phr), preferably between 1 and 5 phr. Examples of coagents useful with the peroxide curative compound of the present invention include triallyl cyanurate; triallyl isocyanurate; tri(methylallyl) isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 1,3,5-trivinyl-trimethylcyclotrisiloxane; and tri(5-norbornene-2-methylene)cyanurate. Particularly useful is triallyl isocyanurate. Other useful coagents include the bis-olefins disclosed in EP 0 661 304 A1, EP 0 784 064, A1 EP 0 769 521 A1, and U.S. Pat. No. 5,585,449.

Fluoropolyrners that do not contain a cure site monomer can be cured by either using the above described peroxide cure systems with a coagent or through known crosslinking reactions such as those using bisphenols/onium-systems. Mixed cure systems (peroxides/bisphenols) also can be used. In these cases, the polymers often have a certain amount of VDF incorporated.

Additives such as carbon black, stabilizers, plasticizers, lubricants, fillers, and processing aids typically utilized in fluoroelastomer compounding can be incorporated into the compositions, provided that they have adequate stability for the intended service conditions.

One or more known acid acceptors can also be added to the inventive composition. However, where the presence of extractable metallic compounds is undesirable (such as for semiconductor applications) the use of inorganic acid acceptors should be minimized, and preferably avoided altogether. Useful acid acceptors include, for example, zinc oxide, calcium hydroxide, calcium carbonate, magnesium oxide, etc.

The curable fluoroelastomer compositions can be prepared by mixing one or more fluoroelastomer(s), the peroxide curative, any selected additive or additives, any additional curatives (if desired), and any other adjuvants (if desired) in conventional rubber processing equipment. The desired amounts of compounding ingredients and other conventional adjuvants or ingredients can be added to the unvulcanized fluorocarbon gum stock and intimately admixed or compounded therewith by employing any of the usual rubber mixing devices such as internal mixers, (e.g., Banbury mixers), roll mills, or any other convenient mixing device. The temperature of the mixture during the mixing process typically should not rise above about 120° C. During mixing, it is preferable to distribute the components and adjuvants uniformly throughout the gum for effective cure.

The mixture is then processed and shaped, such as by extrusion (e.g., into the shape of a tube or a hose lining) or by molding (e.g., in the form of an O-ring). The shaped article can then be heated to cure the gum composition and form a cured article.

Molding or press curing of the compounded mixture usually is conducted at a temperature sufficient to cure the mixture in a desired time duration under a suitable pressure. Generally, this is between about 95° C. and about 230° C., preferably between about 150° C. and about 205° C., for a period of from about 1 minute to 15 hours, typically from 5 minutes to 30 minutes. A pressure of between about 700 kPa and about 20,600 kPa is usually imposed on the compounded mixture in a mold. The molds first may be coated with a release agent and prebaked.

The molded mixture or press-cured article is then usually post-cured (e.g., in an oven) at a temperature and for a time sufficient to complete the curing, usually between about 150° C. and about 300° C., typically at about 230° C., for a period of from about 2 hours to 50 hours or more, generally increasing with the cross-sectional thickness of the article. For thick sections, the temperature during the post cure is usually raised gradually from the lower limit of the range to the desired maximum temperature. The maximum temperature used is preferably about 300° C., and this value is held for about 4 hours or more. This post-cure step generally completes the cross-linking and may also release residual volatiles from the cured compositions. One example of a suitable post-cure cycle involves exposing molded parts to heat under nitrogen for 16 hours at 230° C. The parts are returned to ambient temperature such as by shutting off oven heat.

The fluoropolymor compositions are useful in production of articles such as O-rings, gaskets, tubing, and seals, Such articles are produced by known methods. One such method includes, for example, molding a compounded formulation of the fluoroelastomer composition with various additives under pressure, curing the article, and then subjecting it to a post-cure cycle. The fluoroelastomers of the invention, after curing, exhibit significantly reduced compression set as compared to known elastomers. This improvement is most pronounced with TFE-P elastomers, while other polymers such as 70 wt % fluorine terpolymers or 66% fluorine copolymer elastomers may not exhibit this benefit to the extent seen in TFE-P elastomers.

Objects and advantages of this invention are further illustrated by the following examples, but the particular materials and amounts thereof recited in these examples, as well as other conditions and details, should not be construed to unduly limit this invention.

EXAMPLES

The percentages used below in reference to fluoropolymer preparation are in weight percent (wt %) based on the total of the monomers and salt charged. The parts used below in reference to fluoropolymer compounding are based on parts by weight of the additive to 100 parts by weight of the fluoroelastomer gum (phr). The materials used were available from Aldrich Chem. Co., Milwaukee, Wis. unless otherwise noted.

Test Methods

In the following examples, indicated results were obtained using the following test methods, unless otherwise indicated:

Sample Compounding

A two-roll mill was used to compound 100 parts of each fluoroelastomer gum with 3 phr Ca(OH)$_2$ (available from CP Chemical Bradford, Ill.), 30 phr of N990 carbon black (available from Columbia Chemical, Atlanta, Ga.), 2 phr of a peroxide (2,5-dimethyl-2,5-di(tertiarybutylperoxy)-hexane available as Varox® DBPH 50 from R. T. Vanderbilt Co., Norwalk, Conn.), and 3.5 phr of a 72 wt % triallyl isocyanurate (TAIC) coagent (available from DuPont, Wilmington, Del.).

Post-Cure

Sample sheets measuring 150×150×2.0 mm were prepared for physical property determination by pressing at about 6.9 Mega Pascals (MPa) for 10 minutes at 177° C., unless otherwise noted, to prepare press-cured samples. Then Press-cured sample sheets were exposed to heat under nitrogen for 16 hours at 230° C. The samples were returned to ambient temperature (about 23° C.) before testing.

Physical Properties

Tensile Strength at Break and Elongation at Break were determined using ASTM D 412-92 on samples cut from the post-cure sheet with ASTM Die D. Units are reported megaPascals (MPa).

Compression Set

O-ring samples were measured using ASTM 395-89 Method B. The O-rings had a cross-sectional thickness of 0.139 in. (3.5 mm.). Results are reported as a percentage of the original deflection.

Fluoropolymer Preparation

Example 1–4 and Comparative Examples CE 1–3

Copolymers of tetrafluoroethylene (TFE), propylene (P), and optionally a cure site monomer (CSM) were polymerized by free radical emulsion polymerization using standard techniques known in the art. In a typical experiment, a high pressure stainless steel polymerization kettle with a total volume of 195L was charged with 105 kg of water, 635 g of ammonium perfluorooctanoate (3M™ FC 143, from 3M Co., St. Paul, Minn. (3M)), and 260 g K$_2$HPO$_4$ as a buffering agent. The kettle was sealed and flushed with nitrogen/vacuum cycle three times to ensure an oxygen-free environment. The kettle was heated to 73° C. and pressurized to 17 bars absolute pressure by charging the kettle with a precharge gaseous mixture of the monomers TFE, P, and CSM (4-bromo-3,3,4,4-tetrafluoro butene (BTFB)) in a weight percent of 93.5:4.0:2.5. Once the kettle pressure and temperature had stabilized, the reaction was initiated by the injection of a 10% ammonium persulfate (NH$_4$)$_2$S$_2$O$_8$ (APS) initiator solution in water. The start of the reaction was noted by a drop in kettle pressure, after which time the computer controlled monomer feed system fed monomer into the kettle at a weight ratio of 78.7 TFE:20.7 P:2.6 CSM. A total of 23.4 kg of the monomer mixture was fed over 6.5 h, after which time the polymerization was terminated by the rapid addition of 200 g of propylene. The excess monomer was vented and 129 kg of latex with 19.3% solids was obtained.

The polymer latex was coagulated by salt coagulation with MgCl$_2$. The polymer was washed five times with hot water, isolated, and dried at 130° C. for 16 h. $^1$H/$^{19}$F NMR cross integration method including XRF-spectroscopy was used to determined the polymer composition. The composition was found to contain 75.4 wt % TFE:22 wt %, P:2.6 wt % CSM.

Other polymers were made in a similar fashion. In polymerizations made with APS/KBr initiation system, the KBr was charged to the kettle in the precharge step. The table below provides the polymerization conditions of the other examples and comparative polymers used in this study. The resulting materials were prepared and tested as described in the Test Methods section. The data appear in Table 2, below.

Comparative Examples CE 4 and CE 5

In these examples, terpolymers of tetrafluoroethylene (TEE), hexafluoropropylene (HFP), and vinylidene fluoride (VDF) were polyrmerized by standard free radical emulsion polymerization. A stainless steel kettle with a total volume of 195L was charged with 115 kg of water, 930g of FX 1006 (ammonium perfluorooctanoate, 30% solids in water, 200g ammonium hydroxide (25% active NH$_3$ in water)). The kettle was purged with nitrogen as described in the examples above and simultaneously pressurized with a monomer mixture consisting of 7 wt % TFE, 77 wt % HFP, 15.6 wt % VDF and 0.4 wt % 4-bromo, 3,3,4,4-tetrafluoro butene, until the internal kettle pressure of 15.5 bars absolute and a temperature of 78° C. were reached. Once at equilibrium, the polymerization was initiated by the rapid injection of a 10 wt % solution of APS in water. A reaction was noted by the internal pressure drop, at which time a monomer mixture of TFE, HFP and VDF were fed into the kettle to maintain a constant run pressure. The make up of the monomer mixture is shown in Table 1. The latex obtained from this polymerization was coagulated by use of MgCl$_2$, washed five times with hot water and dried at 130° C. The polymer composition was determined by $^1$H/$^{19}$F cross integration NMR. The data are also shown in Table 1. The resulting materials were prepared and tested as described in the Test Methods section. The data appear in Table 2, below.

Comparative Examples 6 and 7 (CE 6 and CE 7)

In these examples, copolymers of hexafluoropropylene and vinylidene fluoride were polymerized by standard free radical emulsion polymerization. The method was identical to that described for CE 4–5. However, only a copolymer composition of VDF and HFP was used. A stainless steel kettle with a total volume of 4.7L was charged with 2.8 kg of water, 12 g of FX 1006 (ammonium perfluorooctanoate, 30% solids in water, from 3M). The kettle was purged with nitrogen as described above and simultaneously pressurized with a monomer mixture consisting of 66 wt % HFP, 33 wt % VDF and 1 wt % 4-bromo-3,3,4,4-tetrafluoro butene, until the internal kettle pressure reached 14 bars absolute and 80° C. was reached. Once at equilibrium, the polymerization was initiated by the rapid injection of a 10 wt % solution of APS. A reaction was noted by the internal pressure drop, at which time a monomer mixture of HFP and VDF were fed into the kettle to maintain a constant run pressure. The composition of the monomer mixture is shown in Table 1. The latex obtained from this polymerization was coagulated, washed, dried, and analyzed as in CE 4. The data are also shown in Table 1. The resulting materials were prepared and tested as described in the Test Methods section. The data appear in Table 2, below.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual

TABLE 1

Conditions and Compositions

| Ex. | Press. (bars a) | Temp. (° C.) | CSM | g/L KBr | g/L APS | Run time (h) | % solid | TFE (wt %) | Prop (wt %) | VDF (wt %) | HFP (wt %) | CSM (wt %) |
|---|---|---|---|---|---|---|---|---|---|---|---|---|
| 1 | 17 | 73 | BTFB | 1.7 | 3.6 | 6.9 | 19.3 | 76 | 22 | 0 | 0 | 2.6 |
| 2 | 17 | 60 | BTFE | 1.7 | 5.7 | 7.6 | 19 | 76 | 22 | 0 | 0 | 2.0 |
| 3 | 17 | 65 | None | 1.7 | 5.7 | 4.4 | 20.3 | 79 | 21 | 0 | 0 | 0.0 |
| 4 | 17 | 60 | None | 1.7 | 5.7 | 5.8 | 20.2 | 79 | 21 | 0 | 0 | 0.0 |
| CE 1 | 17 | 73 | BTFB | 0 | 3.6 | 6.7 | 14.4 | 76 | 22 | 0 | 0 | 2.6 |
| CE 2 | 17 | 60 | BTFE | 0 | 5.7 | 8.2 | 19.5 | 76 | 22 | 0 | 0 | 2.0 |
| CE 3 | 17 | 65 | None | 0 | 5.5 | 5.7 | 20 | 78 | 22 | 0 | 0 | 0.0 |
| CE 4 | 15.5 | 78 | BTFB | 0.95 | 1.2 | 2.3 | 25 | 24 | 0 | 34 | 42 | 0.9 |
| CE 5 | 15.5 | 78 | BTFB | 0 | 1.2 | 2.1 | 25 | 24 | 0 | 34 | 42 | 0.9 |
| CE 6 | 14 | 80 | BTFB | 0.36 | 0.7 | 4.7 | 29 | 0 | 0 | 62 | 37.3 | 1.7 |
| CE 7 | 14 | 80 | BTFB | 0 | 0.7 | 5.4 | 29 | 0 | 0 | 62 | 37.3 | 1.7 |

TABLE 2

Test Results

| Ex. | Polymer type | CSM | CSM (wt %) | KBr (g) | Br (total wt %) | Tensile (MPA) | EB (%) | Compression Set (%) |
|---|---|---|---|---|---|---|---|---|
| 1 | TFE/P | BTFB | 2.6 | 180 | 1.10 | 10.6 | 210 | 47 |
| 2 | TFE/P | BTFE | 2.0 | 180 | 1.00 | 14.0 | 166 | 20 |
| 3 | TFE/P | None | 0.0 | 48.5 | 0.14 | 13.2 | 260 | 42 |
| 4 | TFE/P | None | 0.0 | 48.5 | 0.10 | 10.8 | 310 | 55 |
| CE 1 | TFE/P | BTFB | 2.6 | None | 0.96 | 8.7 | 110 | 68 |
| CE 2 | TFE/P | BTFE | 2.0 | None | 0.82 | 15.2 | 153 | 36 |
| CE 3 | TFE/P | None | 0.0 | None | 0.00 | not curable | not curable | not curable |
| CE 4 | Terp. | BTFB | 0.9 | 100 | 0.48 | 11.1 | 180 | 38 |
| CE 5 | Terp. | BTFB | 0.9 | None | 0.40 | 10.4 | 200 | 36 |
| CE 6 | Cop. | BTFB | 1.7 | 1 | 0.235 | 17.8 | 320 | 32 |
| CE 7 | Cop. | BTFB | 1.7 | None | 0.251 | 19.4 | 278 | 34 |

We claim:

1. A curable composition comprising:
   a) a fluoropolymor comprising interpolymerized units derived from the polymerization of
      i) at least one monomer of the general formula $CF_2=CF-R_f$, wherein $R_f$ is fluorine or a $C_1-C_8$ perfluoroalkyl,
      ii) at least about 10 mole percent of at least one hydrogen-containing $C_2-C_9$ olefin, based on the total moles of said $CF_2=CFR_f$ and said hydrogen-containing $C_2-C_9$ olefin,
      iii) optionally $CX_2=CX-R$, wherein $CX_2=CX-R$ is chemically distinct from the $CF_2=CF-R_f$ and the hydrogen-containing $C_2-C_9$ olefin, and wherein each X is independently H, F, or Cl and R is a halogen or a $C_1-C_8$ alkyl or alkenyl group that may include one or more ether linkage(s),
      v) optionally a bromine-containing cure site monomer:
   b) optionally, a peroxide curing agent; and
   c) optionally, a crosslinking co-agent,
   wherein said fluoropolymer has an average of two or more bromine atoms including more than one terminal bromine atom(s) per fluoropolymer chain and wherein the fluoronolymer is substantially free of residue from a chain transfer agent.

2. The composition of claim 1 wherein the hydrogen-containing $C_2-C_9$ olefin is selected from α-olefins.

3. The composition of claim 1 wherein the hydrogen-containing $C_2-C_9$ olefin is non-fluorinated.

4. The composition of claim 1 wherein the hydrogen-containing $C_2-C_9$ olefin is selected from the group consisting of ethylene, propylene, butene, pentene, hexene, and combinations thereof.

5. The composition of claim 1 wherein the hydrogen-containing $C_2-C_9$ olefin is propylene.

6. The composition of claim 1 wherein $CX_2=CX-R$ comprises a perfluoro(vinyl ether).

7. The composition of claim 6 wherein the perfluoro(vinyl ether) is selected from the group consisting of a perfluoro (alkyl vinyl ether), a perfluoro(alkoxy vinyl ether), and a combination thereof.

8. The composition of claim 6 wherein the perfluoro(vinyl ether) is selected from the group consisting of perfluoro (methyl vinyl ether), perfluoro(ethyl vinyl ether), perfluoro (propyl vinyl ether), $CF_2=CFOCF_2OCF_2CF_2OCF_3$, $CF_2=CFO(CF_2)_3OCF_3$, $CF_2=CFOCF_2CF_2OCF_3$, and combinations thereof.

9. The composition of claim 1 wherein the fluoropolymer has an average of two or more terminal bromine atoms per fluoropolymer chain.

10. The composition of claim 1 having a bromine-containing cure site monomer.

11. The composition of claim 1 wherein the bromine-containing cure site monomer is selected from bromotrifluoroethylene (BTFE), bromodifluoroethylene (BDFE), bromotetrafluorobutene (BTFB), and combinations thereof.

12. The composition of claim 1 wherein the peroxide curing agent is selected from 2,5-dimethyl-2,5-di (tertiarybutylperoxy)hex-3-yne and 2,5-dimethyl-2,5-di (tertiarybutylperoxy)-hexane, dicumyl peroxide, dibenzoyl peroxide, tertiarybutyl perbenzoate, a,a'-bis(t-butylperoxy-dilsopropylbenzene), and di[1,3-dimethyl -3-(t-butylperoxy)-butyl]carbonate, and combinations thereof.

13. The composition of claim 12 wherein the co-agent as selected from triallyl cyanurate; triallyl isocyanurate; tri (methylallyl) isocyanurate; tris(diallylamine)-s-triazine; triallyl phosphite; N,N-diallyl acrylamide; hexaallyl phosphoramide; N,N,N',N'-tetraalkyl tetraphthalamide; N,N,N', N'-tetraallyl malonamide; trivinyl isocyanurate; 1,3,5-trivinyl-trimethylcyclotrisiloxane; and tri(5-norbomene-2-methylene)cyanurate and combinations thereof.

14. The composition of claim 1 wherein the fluoropolymer is selected from an elastomer and a thermoplastic.

15. An article comprising the cured composition of claim 1.

16. The composition of claim 1 wherein $R_f$ is fluorine.

17. The composition of claim 16 wherein the fluoropolymer comprises from about 90 to about 60 mole percent tetrafluoroethylene.

18. The composition of claim 16 wherein the fluoropolymer comprises from about 15 to about 30 mole percent of a hydrogen-containing $C_2$–$C_9$ olefin.

19. The composition of claim 16 wherein the hydrogen-containing $C_2$–$C_9$ olefin is a polypropylene.

20. A cured fluoroelastomer composition comprising the reaction product of:
   a) a copolymer comprising tetrafluoroethylene and propylene having an average of two or more bromine atoms including one or more terminal bromine atom(s) per polymer chain;
   b) a peroxide curing agent; and
   c) optionally, a crosslinking co-agent;
   wherein the composition has a compression set value lower than a comparative copolymer having a similar comonomer ratio and having an average of less than two bromine atoms per polymer chain.

21. A method of preparing a fluoropolymer composition comprising:
   a) combining
      i) at least one monomer of the general formula $CF_2$=CF—$R_f$ wherein $R_f$ is fluorine or a $C_1$–$C_8$ perfluoroalkyl,
      ii) at least about 10 mole percent of at least one hydrogen-containing $C_2$–$C_9$ olefin, based on the total moles of said $CF_2$=$CFR_f$ and said olefin, iii) a brominated salt,
      iv) optionally $CX_2$=CX—R, wherein $CX_2$=CX—R is chemically distinct from the $CF_2$=CF—$R_f$ and the hydrogen-containing $C_2$–$C_9$ olefin, and wherein each X is independently H, F, or Cl and R is a halogen or a $C_1$–$C_x$ alkyl or alkenyl group that may include one or more ether linkage(s), and
      v) optionally a bromine-containing cure site monomer; and
      vi) an initiator; and
   b) polymerizing the combination
   wherein said fluoropolymer has an average of two or more bromine atoms including more than one terminal bromine atom(s) per fluoropolymer chain and wherein the fluoropolymer is substantially free of residue from a chain transfer agent.

22. The composition of claim 21 wherein the brominated salt is selected from a Group I or Group II metal salt or a combination thereof.

23. The composition of claim 21 wherein the brominated salt is selected from KBr, $FeBr_2$, CuBr, $NH_4Br$, and combinations thereof.

24. The method of claim 21 wherein the initiator is ammonium persulfate.

25. The method of claim 21 further comprising blending a peroxide, and optionally blending a crosslinking co-agent, with the resulting polymer.

26. The method of claim 25 further comprising curing the polymer to form a shaped article.

* * * * *

UNITED STATES PATENT AND TRADEMARK OFFICE
CERTIFICATE OF CORRECTION

PATENT NO. : 6,803,435 B2
DATED : October 12, 2004
INVENTOR(S) : Coggio, William D.

It is certified that error appears in the above-identified patent and that said Letters Patent is hereby corrected as shown below:

Title page,
Item [57], ABSTRACT,
Line 4, "toast" should be shown as -- least --

Column 2,
Lines 5 and 41, "$CH_2=CF-R_f$," should be shown as -- $CF_2=CF-R_f$, --
Line 8, "$CH_2=CFR_f$" should be shown as -- $CF_2=CFR_f$ --

Column 4,
Line 13, "$NR_4^+Br$," should be shown as -- $NR_4^+Br^-$, --

Column 5,
Line 13, "a,a'-bis(i-" should be shown as -- a,a'-bis(t- --

Column 8,
Line 11, "(TEE)," should be shown as -- (TFE), --

Column 9,
Line 66, "fluoronolymer" should be shown as -- fluoropolymer --

Column 10,
Line 54, "dilsopropylbenzene)," should be shown as -- diisopropylbenzene), --
Line 56, "as" should be shown as -- is --
Line 62, "(5-norbomene-2-" should be shown as -- (5-norbornene-2- --

UNITED STATES PATENT AND TRADEMARK OFFICE
CERTIFICATE OF CORRECTION

PATENT NO. : 6,803,435 B2
DATED : October 12, 2004
INVENTOR(S) : Coggio, William D.

It is certified that error appears in the above-identified patent and that said Letters Patent is hereby corrected as shown below:

Column 12,
Line 5, "$C_1$-$C_x$" should be shown as -- $C_1$-$C_8$ --
Line 21, "FcBr$_2$," should be shown as -- FeBr$_2$, --

Signed and Sealed this

Eighth Day of February, 2005

JON W. DUDAS
*Director of the United States Patent and Trademark Office*